United States Patent [19]
Getzlaff et al.

[11] Patent Number: 5,754,875
[45] Date of Patent: May 19, 1998

[54] COMPUTER SYSTEM WITH DOUBLE WIDTH DATA BUS

[75] Inventors: Klaus Jörg Getzlaff, Schoenaich; Johann Hajdu, Boeblingen; Wilhelm Ernst Haller, Remshalden; Birgit Withelm, Holzgerlingen, all of Germany

[73] Assignee: International Business Machines Corporation, Armonk, N.Y.

[21] Appl. No.: 588,694

[22] Filed: Jan. 19, 1996

Related U.S. Application Data

[63] Continuation of Ser. No. 248,854, Mar. 4, 1994, abandoned, which is a continuation of Ser. No. 751,894, Aug. 29, 1991, abandoned.

[30] Foreign Application Priority Data

Sep. 3, 1990 [EP] European Pat. Off. ............. 90116852

[51] Int. Cl.$^6$ ............................................. G06F 3/14
[52] U.S. Cl. .................. 395/800; 395/306; 395/307; 395/821; 395/847; 395/886; 364/DIG. 1
[58] Field of Search .................... 395/800, 821, 395/872, 867, 878, 886, DIG. 1, 306, 307

[56] References Cited

U.S. PATENT DOCUMENTS

| | | | |
|---|---|---|---|
| 3,978,456 | 8/1976 | Moran | 395/275 |
| 4,099,231 | 7/1978 | Kotok et al. | 395/425 |
| 4,237,543 | 12/1980 | Nishio et al. | 395/275 |
| 4,296,469 | 10/1981 | Gunter et al. | 395/325 |
| 4,467,447 | 8/1984 | Takahashi et al. | 395/250 |
| 4,489,395 | 12/1984 | Sato | 364/200 |
| 4,847,759 | 7/1989 | Oklobdzija | 395/425 |

OTHER PUBLICATIONS

Lin, "Bidirectional FIFO in the processor-to-peripheral communications", IEEE Nov. 14–15, 1989, pp. 131–136
Neal Margulis, i860 Mrcroprocessor internal architecture, Mar. 1990, vol. 14, pp. 90–91.
E. Goldberg & R. Naro "CMOS Microporcessor Series Shapes its Personality with Software and Hardware" Mar. 21, 1985 p. 157.
Stephen Ohr, "Superlong Instructions Help Supermini Refine Number Crunching" Nov. 14, 1985 p. 41.

*Primary Examiner*—Alyssa H. Bowler
*Assistant Examiner*—Dzung C. Nguyen
*Attorney, Agent, or Firm*—Arthur J. Samodovitz

[57] ABSTRACT

A computer system is described with a 32 bit arithmetic and logic unit which is coupled to a 64 bit data bus. A number of general purpose registers are provided which have 32 bits each and which are organized in two groups. Two 32 bit data words which are present on the data bus can be transmitted and stored in the two groups of the general purpose registers. From there, the two data words can be transmitted via two operand registers to the arithmetic and logic unit. Several further lines are provided for bypassing the general purpose registers and/or the arithmetic and logic unit, if desired. Due to the fact that two data words can always be transmitted, the performance of the computer system is enhanced.

16 Claims, 2 Drawing Sheets

COMPUTER SYSTEM WITH DOUBLE WIDTH DATA BUS

The application is a continuation of application Ser. No. 08/248,854, filed Mar. 4, 1994, now abandoned which is a continuation of Ser. No. 07/752,894 filed Aug. 29, 1991, now abandoned.

BACKGROUND OF THE INVENTION

The invention relates to a computer system with a data bus, registers, and an arithmetic and logic unit.

A computer system of that kind is generally known and will be described now in connection with FIG. 1 which shows a schematic block diagram of a prior art computer system.

The computer system shown in FIG. 1 contains an arithmetic and logic unit ALU (10) which is capable of processing data words with a width of 32 bits. This means that the ALU (10) is able to add, subtract, etc. two data words with 32 bits, respectively, and to create as a result a data word with 32 bits. In FIG. 1, two input data lines (14, 15) are provided for the transmission of the two data words to the ALU (10), each of the input data lines (14, 15) having 32 lines. Furthermore, one output data line (17) is provided for the result created by the ALU (10), this output data line (17) having 32 lines.

The two input lines (14, 15) have their origin in two operand registers ORA and ORB (12, 13) in a manner that the ORA (12) is connected with the ALU (10) via the input data line (14) and the ORB (13) via the input data line (15). The output data line (17) is connected to a data bus (130) which is able to transmit data words with 32 bits or in other words which has a bus width of 32 bits.

Via data lines (160, 162, 163) the ORA (12) and the ORB (13) are connected with a number of general purpose registers GPR (150). Every one of the data lines (160, 162, 163) has 32 lines. The GPR (150) has 64 registers, each with 32 bits and is controlled via control lines (155). Data words can be transmitted from any of the 64 registers of the GPR (150) to both operand registers A and B (12, 13) depending on the signals on the control lines (155).

The GPR (150) is connected with the data bus (130) via a first data line (132), a receiving register RR (134) and a second data lines (140). Both cables (132, 140) and the RR (134) are able to transmit and store data words with a width of 32 bits. The data words coming from the data bus (130) can be transmitted to any of the 64 registers of the GPR (150) depending on the signals on the control lines (155).

Data words which shall be processed in the ALU (10) are placed one after the other on the data bus (130). At first, they are stored from the data bus (130) in the RR (134). Then they are transmitted to the GPR (150) and stored in the desired register of the GPR (150). From the respective registers of the GPR (150) the data words are transmitted to the ORA (12) or to the ORB (13), as desired, and are stored therein. The ALU (10) receives the two data words stored in the ORA (12) and in the ORB (13) at the same time and processes them, e.g. adds them. The result, e.g. the sum, is transmitted from the ALU (10) to the data bus (130). The whole process works in a pipeline, that means that the data words of a second or third addition or subtraction are transmitted to the ORA (12) and the ORB (13) or to the GPR (150) while the data words of the above described first addition are processed in the ALU (10), etc.

As already mentioned, the data words on the data bus (130) have a width of 32 bits. As a consequence, the 64 registers of the GPR (150) as well as the ORA (12) and the ORB (13), all having a width of 32 bits, too, can only be filled up one after the other. This has the result, that the ALU (10) has to wait some of the time for the incoming data words and therefore the performance of the computer system is decreased in these cases.

An object of the invention is to increase the performance of the computer system.

SUMMARY OF THE INVENTION

The invention solves this object by providing a data bus which has a width which is twice the width of the registers. Having twice the width of the registers and therefore twice the width of the data words, the data bus is able to transmit two data words at the same time. These two data words can be stored by two of the registers at the same time, with the consequence that the registers can be filled up faster. The result is that the arithmetic and logic unit does not have to wait for incoming data words and the performance of the computer system is increased.

In an embodiment of the invention two registers are provided which are connected to the data bus for receiving data words from the data bus. With the help of these two registers it is possible to receive two data words at the same time from the data bus and to store the two data words. The data words can then be processed by succeeding registers or the like.

In another embodiment of the invention a number of registers are provided for that purpose. These registers are connected to the above mentioned two registers for receiving data words from the two registers. This number of registers makes it possible that more than only two data words coming from the data bus can be stored. Furthermore, it is possible that this number of registers is organized in two groups and that the two groups are connected with only one of the two registers, respectively. The data words coming from the data bus can then be stored in the two groups in pairs.

In another embodiment of the invention two further registers are provided which are connected with each of the two groups of the above mentioned number of registers and with the arithmetic and logic unit. A data word being stored in one of the two groups of the number of registers can therefore be transmitted to both of the two registers as desired.

In further embodiments of the invention these two further registers are connected with the data bus for receiving and for transmitting data words. In the first case, the number of registers is bypassed and in the second case, the arithmetic and logic unit is bypassed. In the second case, it is furthermore possible to transmit the data words not only to the data bus but also to the two previously mentioned registers.

DETAILED DESCRIPTION OF THE INVENTION

Figure 1:
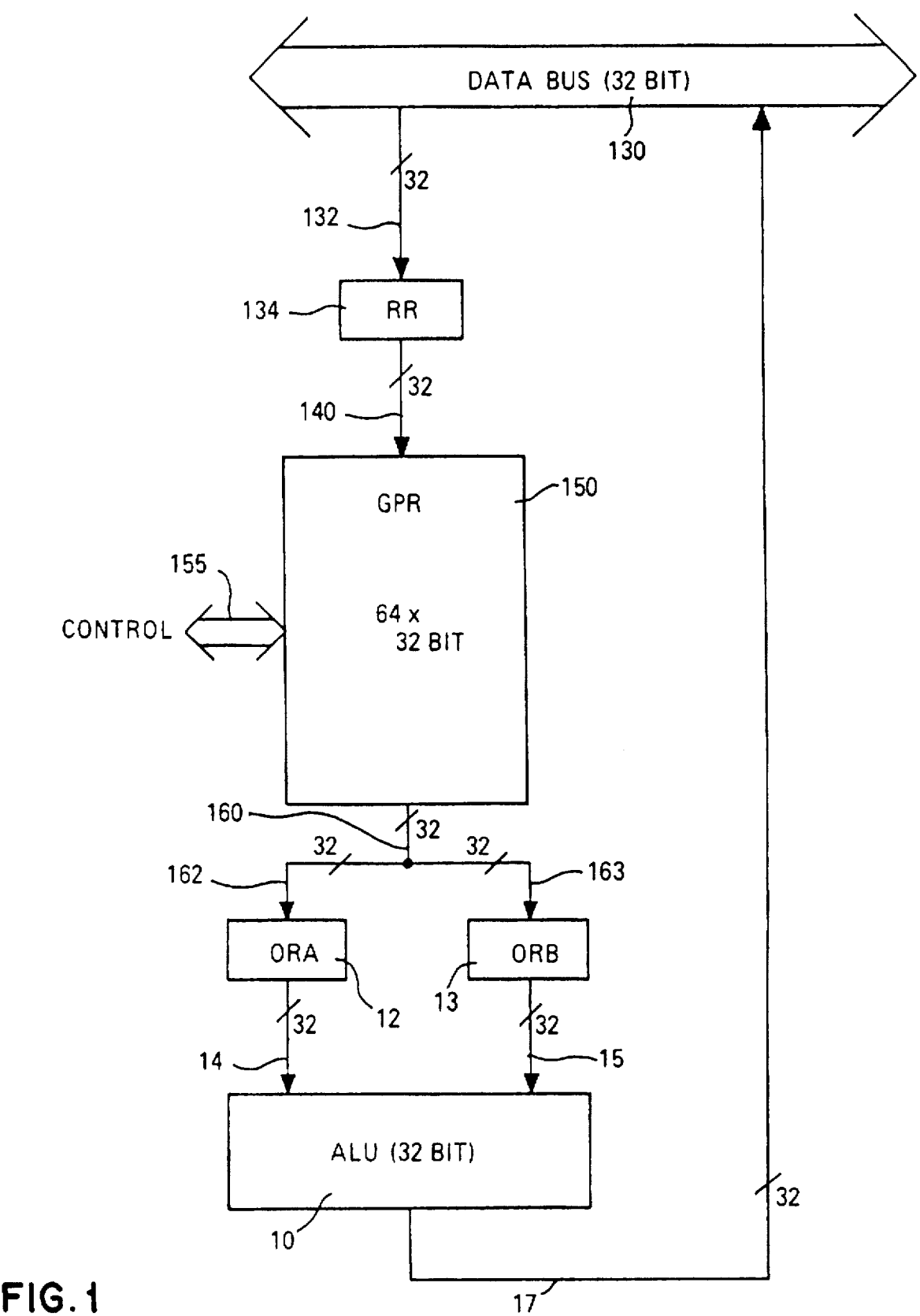
FIG. 1 shows a schematic block diagram of a prior art computer system.

A computer system in accordance with the present invention will now be described in connection with the drawing where like numerals indicate like elements throughout and particularly FIG. 2 thereof. The computer system shown in FIG. 2 contains the arithmetic and logic unit ALU (10) with the output data line (17) and the operand registers ORA and ORB (12, 13) which are connected with the ALU (10) via the data lines (14, 15) as was already described in connection with FIG. 1.

Figure 2:
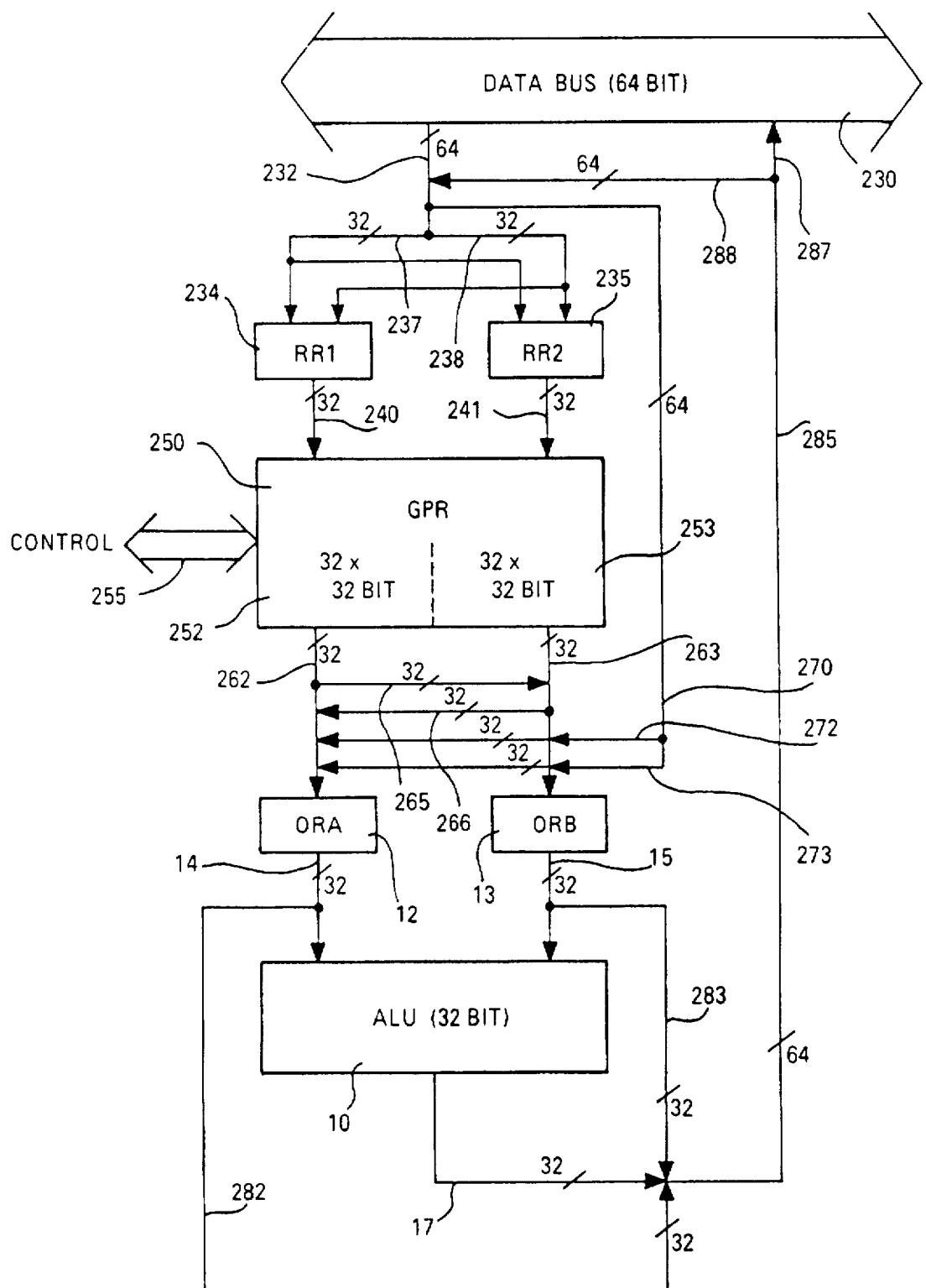
FIG. 2 shows a schematic block diagram of a computer system in accordance with the present invention.

Furthermore, the computer system shown in FIG. 2 contains a number of general purpose registers GPR (250). The GPR (250) has 64 registers each having 32 bits. The 64 registers of the GPR (250) are organized in two groups (252, 253) each having 32 registers. All registers in the two groups (252, 253) are controlled via control lines (255) for selecting desired registers.

The GPR (250), the ORA (12) and the ORB (13) are connected via data lines (262, 263, 265, 266) for transmitting data words from the GPR (250) to the ORA (12) and the ORB (13). The data line (262) connects one (252) of the two groups (252, 253) of the GPR (250) with the ORA (12) and the data line (263) connects the other group (253) with the ORB (13). The data lines (265, 266) interconnect the data line (262) and the cable (263) with the result that data words from one (e.g. 252) of the two groups (252, 253) of the GPR (250) can be transmitted not only to the ORA (12) but also to the ORB (13). All data lines (262, 263, 265, 266) have 32 lines.

Two receiving registers RR1 and RR2 (234, 235) are connected via data lines (240, 241) to the GPR (250) for transmitting data words from the RR1 (234) and the RR2 (235) to the GPR (250). The RR1 (234) is connected with one (252) of the two (252, 253) groups of the GPR (250) and the RR2 (235) is connected with the other group (253). The RR1 (234) and the RR2 (235) are both able to store 32 bits. The data lines (240, 241) have each 32 lines.

The RR1 (234) and the RR2 (235) are connected with a data bus (230) for receiving data from this data bus (230). This data bus (230) is able to transmit data words with 64 bits or in other words this data bus (230) has a bus width of 64 bits.

For the connection of the data bus (230) and the RR1 (234) and the RR2 (235) a data line (232) is split into two data lines (237, 238). The data line (232) has 64 lines and is connected to the data bus (230). The two data lines (237, 238) have 32 lines each and each of them is connected with the RR1 (234) as well as with the RR2 (235).

A data line (270) with 64 lines is provided which has its one end connected to the data line (232). The other end of the data line (270) is split into two data lines (272, 273) with 32 lines, respectively, each of these two data lines (272, 273) is connected with the data lines (262, 263) and therefore to the ORA (12) and the ORB (13).

A data line (282) is provided which has 32 lines and which is connected at one end with the data line (14). Accordingly, a data line (283) is provided which has 32 lines and which is connected at one end with the data line (15). The other ends of the data lines (282, 283) are combined with the data line (17) to form a data line (285). The three data lines (282, 823, 17) which are combined each has 32 lines, respectively. The data line (285) which is formed out of the combination has 64 lines.

This last mentioned data line (285) with 64 lines is connected to the data bus (230) by a data line (287) and to the data line (232) by a cable (288). The cables (287, 288) each has 64 lines.

Data words which shall be processed by the ALU (10) are present on the data bus (230). As the data bus (230) has a width of 64 bit and the data words have 32 bits, there are always two data words present on the data bus (230) at the same time. These two data words are transmitted to the RR1 (234) and the RR2 (235) via the 64 bit data line (232) and the two 32 bit cables (237, 238) at the same time. From there, the two data words are transmitted to the GPR (250) via the two 32 bit data lines (240, 241). The two data words are stored as a pair in two registers of the GPR (250), the two registers belonging to different groups (252, 253) of the GPR (250).

From the GPR (250) the data words are transmitted to the ORA (12) and the ORB (13). It is possible to transmit data words from any of the two groups (252, 253) of the GPR (250) to any of the ORA (12) or the ORB (13) via the 32 bit data lines (262, 263, 265, 266). The two data words stored in the ORA (12) and the ORB (13) are then transmitted to the ALU (10) to be processed, e.g. to be added. The result of this addition has 32 bits and is output on data line (17). This resultant data word can be combined with another 32 bit data word coming from the ORA (12) or the ORB (13).

The transmitting and the processing of the data words in the registers and the ALU (10) works in a pipeline mode. This means that a data word is transmitted e.g. to the ORB (13) in a first cycle and is processed in the ALU (10) in a second cycle. In the same second cycle, another data word is transmitted to the ORB (13) e.g. for being processed by the ALU (10) in a third cycle. In this manner, the resultant data word outputted by the ALU (10) can be combined with a data word which is outputted by the ORA (12) or the ORB (13) in the same cycle and which bypasses the ALU (10) via the data lines (282, 283). The resultant data word from the ALU (10) and the combined data word from the ORA (12) or the ORB (13) is then present on the 64 bit cable (285).

From this data line (285) the 64 bit data word can be transmitted to the data bus (230) via the data line (287).

In this manner that the resultant data word can be stored in a memory of the computer system.

Another possibility is that the 64 bit data word is transmitted to the RR1 (234) and to the RR2 (235) via the data lines (288, 232, 237, 238). In this manner the resultant data word can be stored in the GPR (250), again, for a further use.

It is possible, too, that the 64 bit data word is transmitted to the ORA (12) and to the ORB (13) via the data lines (288, 232, 270, 272, 273). In this case, the RR1 (12), the RR2 (13) and the GPR (250) are bypassed and the 64 bit data word can be processed by the ALU (10) in a following cycle. In this manner the resultant data word can be processed by the ALU (10) and/or the combined data word can be used by the ALU (10).

Furthermore, it is possible that the ALU (10) is bypassed by both data words, the data word coming from the ORA (12) via the data line (282) and the data word coming from the ORB (13) via the data line (283). The bypassing data words are combined and are then present on the 64 bit data line (285).

This last mentioned possibility is used for moving a number of data words from an origin in a memory of the computer system to another destination. The data words are taken from the origin onto the data bus (230) in pairs of two. They bypass the RR1 (234) and the RR2 (235) and the GPR (250) and are then stored in the ORA (12) and the ORB (13). Then, the two data words bypass the ALU (10) and are transmitted via the data bus (230) to the desired destination. Of course, if it is desired, the two data words can be stored in the RR1 (234) and the RR2 (235), too, for being transmitted and stored in the GPR (250) for further processing.

We claim:

1. A computer system comprising:
   a data bus having a first bit width and simultaneously carrying first and second data words each having a second bit width;
   a first data line having said first bit width and connected to said data bus to simultaneously carry said first and second data words from said data bus;
   first and second registers coupled to receive and store said first and second data words, respectively, after being carried by said first data line;
   an ALU coupled to said registers to process said first and second data words and output a result of said processing, said result having said second bit width,
   a second data line having said first bit width and connected between the ALU output and said data bus to pass the ALU result to said data bus; and
   a crossover data line having said first bit width and connected between said first and second data lines for passing to said first data line contents of said second data line bypassing said data bus.

2. A system as set forth in claim 1 wherein said crossover data line is connected directly between said first and second data lines.

3. A system as set forth in claim 1 further comprising:
   third and fourth registers coupled between said first data line and said first and second registers; and
   fifth and sixth registers coupled between said third and fourth registers and said first and second registers.

4. A system as set forth in claim 3 further comprising:
   a third data line having said first bit width, connected at one end to said first data line and divided at an opposite end into fourth and fifth data lines each having said second bit width, said fourth and fifth data lines being connected to said first and second registers, respectively, for passing said first and second data words to said first and second registers bypassing said third, fourth, fifth and sixth registers.

5. A system as set forth in claim 4, wherein said first and second registers operate in a pipeline mode relative to said third and fourth registers and said third and fourth registers operate in a pipeline mode relative to said fifth and sixth registers.

6. A system as set forth in claim 1 further comprising:
   a sixth data line having said second bit width and connected to an input of said ALU to bring said first data word into said ALU; and
   a seventh data line having said second bit width and connected to another input of said ALU to bring said second data word into said ALU for processing with said first data word.

7. A system as set forth in claim 6 wherein said ALU output, said sixth data line and said seventh data line join to said second data line.

8. A computer system comprising:
   a data bus having a first bit width and simultaneously carrying first and second data words each having a second bit width;
   a first data line having said first bit width and connected to said data bus to simultaneously carry said data words from said data bus;
   first and second registers coupled to receive said first and second data words, respectively, after being carried by said first data line;
   an ALU;

second and third data lines each having said second bit width, said second and third data lines being connected between said first and second registers and said ALU to bring said first and second data words, respectively, to said ALU, said ALU outputting a result of said processing, said result having said second bit width;
   a fourth data line having said first bit width and connected between the output of said ALU and said data bus to pass the ALU output to said data bus; and
   a fifth data line having said second bit width and connected between said second data line and said fourth data line such that the result of said ALU can be combined with a subsequent input to said ALU onto said fourth data line.

9. A system as set forth in claim 8 further comprising:
   a sixth data line having said second bit width and connected between said third data line and said fourth data line such that the result of said ALU can be combined with a subsequent input to said ALU onto said fourth data line.

10. A system as set forth in claim 8 wherein a data word m of said second bit width is passed to said first register in a cycle n and processed in said ALU in a next cycle n+1, a data word m+2 of said second bit width is passed to said first register in cycle n+1 and combined onto said fourth data line with the ALU result involving data word m.

11. A method for processing two N-bit data words together in an ALU, said method comprising the steps of:
   supplying the two N-bit data words simultaneously onto a 2N-bit wide data bus;
   reading said two data words simultaneously from said data bus into two respective registers;
   after the reading step, processing said two data words in an N-bit ALU and outputting from said ALU an N-bit result of said processing;
   passing said output from said ALU onto said data bus; and
   passing onto said data line along with said output, another data word which is read from said registers to said data line bypassing said ALU.

12. A method as set forth in claim 11 wherein said output is passed from said ALU data bus via a 2N-bit wide data line connected to said data bus.

13. A method as set forth in claim 11 further comprising the step of passing said output and said other data word from said data line to said registers bypassing said data bus.

14. A method as set forth in claim 11 further comprising the step of passing said output from said data line to one of said registers bypassing said data bus.

15. A computer system comprising:
   a data bus (DB) having a primary bit width for transmitting a plurality of data words each having a secondary bit width;
   a plurality of receiving registers (RRs) each for storing a data word of the secondary bit width transmitted over the data bus, the receiving registers each receiving a secondary bit width data word transmitted over one of a plurality of secondary bit width RR data lines joined to the data bus by a primary bit width data bus data line, the primary bit width data bus data line transmitting simultaneously a plurality of secondary bit width data words to the receiving registers;
   a plurality of secondary bit width general purpose registers (GPRs) logically divided into a plurality of memory groups each directly coupled to one of the receiving registers through one of a plurality of secondary bit width GPR data lines, each of the secondary bit width general purpose registers for storing a secondary bit width data word from a corresponding receiving register and for transmitting the secondary bit width data word from a corresponding receiving register in response to instructions received over a control bus coupled to the GPR;

a plurality of operating registers (ORs) each coupled directly to the GPR through one of a plurality of secondary bit width OR data lines, each of the ORs for storing a secondary bit width data word transmitted from any of the GPRs in any of the memory groups;

an ALU coupled directly to the ORs through a plurality of secondary bit width ALU data lines each coupled to one of the ORs, the ALU for performing a calculation with secondary bit width data words received over the ALU data lines from the ORs;

the ALU outputting an ALU result directly over a secondary bit width ALU result data line, the ALU result data line coupled directly to the data bus through a primary bit width ALU-DB data line for transmitting the ALU result to the data bus;

a primary bit width DB-OR data line coupled directly to the primary bit width data bus data line and which divides into a plurality of secondary bit width DB-OR data lines each coupled to one of the ORs, for transmitting from the primary bit width data bus data line directly to the ORs any secondary bit width data words transmitted over the primary bit width data bus data line, such that said any secondary bit width data words transmitted over the primary bit width data bus data line bypass the RRs and the GPRs; and a primary bit width crossover data line coupled directly to the ALU-DB data line and the primary bit width data bus data line for transmitting to the primary bit width data bus data line any primary bit width data words transmitted over the ALU-DB data line.

16. A computer system as set forth in claim 15 wherein the GPRs, ORs, and the ALU operate in a pipeline mode.

* * * * *